Patented Nov. 9, 1948

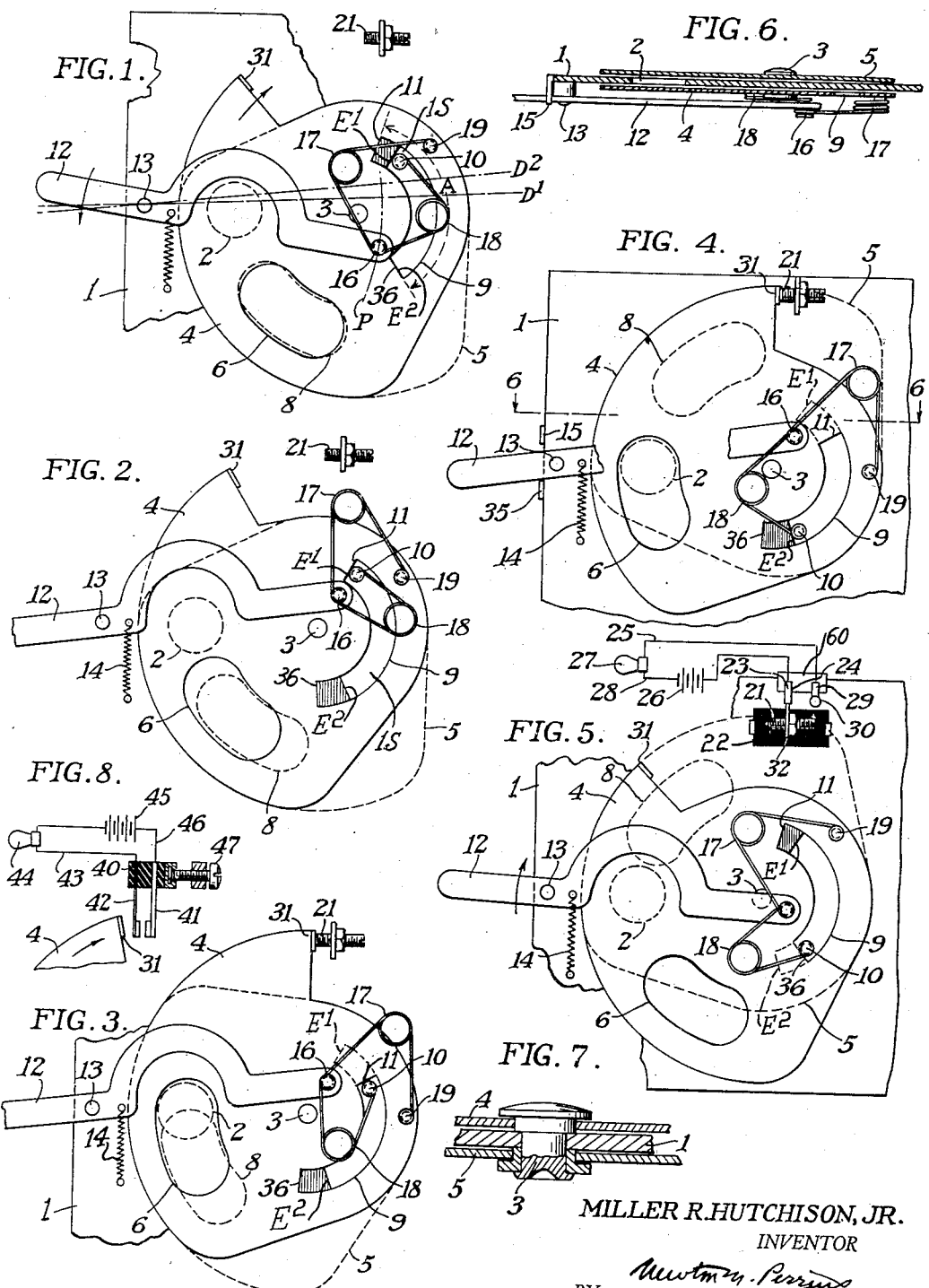

2,453,321

UNITED STATES PATENT OFFICE 2,453,321

BUILT-IN FLASH SYNCHRONIZER FOR SHUTTER BLADE AND COVER BLIND TYPE SHUTTERS

Miller R. Hutchison, Jr., Rochester, N. Y., assignor to Eastman Kodak Company, Rochester, N. Y., a corporation of New Jersey Application October 12, 1945, Serial No. 622,027

5 Claims. (Cl. 95—11.5)

This invention relates to photography and more particularly to inexpensive synchronizing shutters for cameras. One object of my invention is to provide a synchronizer for camera shutters of the pivoted disk type in which the synchronizing apparatus can be readily and exactly adjusted to time a shutter flash properly with respect to the exposure. Another object of my invention is to provide a synchronizing switch on a shutter of the type employing a cover blind, this cover blind being operable in timed relation to the shutter blade. Other objects will appear from the following specification, the novel features being particularly pointed out in the claims at the end thereof.

In the ordinary type of shutter blade and cover blind shutter, it is customary for a trigger to move a cover blind to uncover an exposure aperture after which a shutter blade may move to make an exposure. With such shutters, the speed of movement of the trigger ordinarily controls the speed of the movement of the cover blind and, therefore, it is generally impossible to properly synchronize a shutter by having the cover blind operate a switch. However, with the improved form of shutter blade and cover blind construction shown in my copending application for Synchronizing shutter switch, Serial No. 622,026, filed October 12, 1945, I have provided a novel type of blade and cover blind shutter in which the speed of movement of the trigger does not and cannot have any effect on the speed of movement of the cover blind, and in which the movement of the cover blind and the shutter blade is controlled.

My present invention is directed to a blade and cover blind shutter of the type shown in my application above referred to, and in which the cover blind operates a synchronizing switch which must, because of the construction of the blade and shutter blind cover, operate the switch in proper synchronism with the movement of the shutter blade.

Coming now to the drawings wherein like reference characters denote like parts throughout:

Fig. 1 is a schematic view showing certain shutter parts in elevation and showing a shutter mechanism without its supporting plate, the parts being in a normal position of rest;

Fig. 2 is a view similar to Fig. 1 but with the shutter parts shown as they start to move to make an exposure;

Fig. 3 is a view similar to the preceding figures but with the shutter parts in the position they assume as an exposure is being started;

Fig. 4 is a view similar to the preceding figures but also showing a part of the supporting plate and with the shutter parts shown in the position they assume after an exposure has been made;

Fig. 5 is a view similar to the preceding figures but with the trigger partially released after an exposure has been made;

Fig. 6 is a sectional view taken on line 6—6 of Fig. 4;

Fig. 7 is an enlarged fragmentary section taken through the shutter and cover blind stud; and Fig. 8 is a fragmentary view showing a slightly different embodiment of my invention.

In the drawings wherein one embodiment of a shutter of the blade and cover blind type is illustrated, my shutter may consist of a supporting plate 1 including an exposure aperture 2, this plate pivotally supporting on a stud 3 a cover blind 4 on one side of the support 1 as shown in Fig. 7 and a shutter plate 5 on the opposite side of the supporting plate 1. Plate 1 has an arcuate slot 1S concentric with pivot 3 and having ends E1 and E2. A pin 10, to be later described, may pass through slot 1S. This slot extends through the angle A, Fig. 1.

The cover blind 4 is provided with an aperture 6, here shown as an elongated aperture, which may swing to uncover and cover the exposure aperture 2. The shutter plate 5 is much like the cover blind and it includes an elongated slot 8 which may swing past an exposure aperture 2 uncovering and covering this aperture to make an exposure. There is a lost motion connection between the cover blind and shutter plate which preferably consists of an arcuate slot 9 in the cover blind through which a pin 10, carried by the shutter plate 5, projects. This pin 10 passes through arcuate slot 1S in plate 1 which is long enough to permit pin 10 to move through its full range of movement. The end of the slot E1 coincides with the end 11 of slot 9 when cover blind 4 is in the Fig. 2 position. The end E2 serves as a limiting stop for the pin 10 when in the Fig. 4 position in which an exposure has been completed. Thus, after the cover blind has moved to a predetermined position, an end 11 of the slot 9 will cause the pin 10 to move and thereby will cause the shutter plate 5 to move. While this pin and slot requires the cover blind and shutter plate to move together, as will be hereinafter more fully described, it likewise permits the cover blind and shutter blade to move separately.

A shutter trigger 12 may be pivotally mounted at 13 to the supporting plate 1 and this trigger is preferably provided with a spring 14 which tends to move the trigger in a clockwise direction with respect to the drawings. This spring normally holds the trigger against a stop 15 in a normal position of rest in which the parts are in their Fig. 1 position. The trigger 12 carries a stud 16 on the end of the trigger lever to which there are attached one end of the springs 17 and 18. These springs are preferably of the hairpin type. Spring 17 may be attached to a stud 19 carried by the cover blade 4, and spring 18 may be attached to a pin 10 carried by the shutter plate 5. These springs form the sole connection between the trigger and the cover blind and shutter plate so that any movement of the trigger must be transferred to the cover blind 4 and the shutter plate 5 through these springs. This construction prevents the cover blind 4 from moving at the same speed as the trigger 12 as is customary with this type of shutter. However, it also enables me to properly synchronize the shutter plate 5 with a flash synchronizing switch in the following manner.

As indicated in Fig. 5, I provide a switch which, in this instance, may consist of a relatively-fixed abutment 21 carried by a block of insulation 22, this abutment carrying a plug 23 by which it may be attached to a suitable flash synchronizing circuit. Such a circuit may include a terminal 60 having two sockets 24 and 29; one of which, 29, is connected through a wire 25 to a lamp 27. A wire 28 is connected through a battery 26 to the terminal socket 24. Plug 23 enters socket 24. Socket 29 receives a plug 30 which is grounded on the shutter-supporting plate 1. Thus, in order to close the switch, a circuit may be made by causing the cover blind 4, which is attached to the plate 1, to strike the pin 21. I provide an upstanding lug 31 which may make the circuit by striking the contact 21 and in this form of my invention, the lug 31 forms a movable switch contact which is normally held open while the screw 21 forms a relatively-fixed contact. The screw 21 may be moved in the threaded flange 32 to synchronize the switch in a factory set-up if desired. As will be obvious when the trigger 12 is depressed, the hairpin spring 17 is tensioned and released as the pin 16 swings through the arcuate path indicated by the line "P." It should be noticed from Fig. 1 that as the trigger 12 moves downwardly in the direction shown by the arrow, the pin 16 moves upwardly until it intersects the line "D-1" between the pivotal stud 3 and the pin 19 carried by the cover blind 4. When this intersection occurs, the spring 17 has been fully tensioned and the parts are on a dead center. Slight further movement, however, releases the spring 17 so that this spring may then drive the cover blind 4 in a clockwise direction. It should also be noticed that when the pin 16 passes through its arcuate path "P" it will intersect a line "D-2" slightly beyond the line "D-1" this being the dead center point with respect to the pin 10 carried by the shutter plate 5. Consequently, a slight further movement either of the pin 16 through the path "P" or of the pin 10 about the pivot 3 will release the tensioned hairpin spring 18. I prefer to have this occur in the following manner. When the hairpin spring 17 has been tensioned and released, the cover blind 4 will start to move. This movement occurs before any movement of the shutter plate 5, as will be obvious. However, as soon as the cover blind 4 moves to its Fig. 2 position, since the lost motion between the parts 10 and 11 has been taken up, the end 11 of the slot 9 will strike the pin 10 and will cause the tensioned hairpin spring 18 to be released because the pin 10 will be moved in a clockwise direction by the cover blind 4. By this time the trigger 12 has struck the stop 35 shown in Fig. 4. Movement of the cover blind and shutter blade will continue together under the impulse of their respective springs 17 and 18 as the slot 6 moves to a position to uncover the aperture 2. The fully uncovered position is shown in Fig. 3, at which point the switch members 31 and 21 close the switch so that continued movement of the shutter blade 5 causes the slot 8 to uncover and cover the aperture 2 and make an exposure.

It will be noticed from Fig. 3 that the switch 21—31 is closed when the cover blind fully uncovers the exposure aperture 2 and since the pin 21 of the switch forms a stop for the cover blind 4, the cover blind ceases movement when it reaches its Fig. 3 position. However, the spring 18 continues to move the shutter plate 5 as the pin 10 swings through the arcuate slot 9 until the shutter plate 5 has opened and closed the exposure aperture as is indicated in Fig. 4. The exposure has now been made and the flash of the lamp 27 has been properly synchronized with the exposure. If now the trigger 12 is released, the spring 14 will move the parts through a reverse movement. The first movement occurs due to the position of the cover blind 4, the spring 17 being tensioned and released so that the cover blind will first move to its initial position of rest shown in Fig. 1. As this movement occurs, the opposite end 36 of the arcuate slot 9 strikes the shutter pin 10, thereby initiating movement of the shutter blade 5 which will return to its initial position under the impulse of its spring 18.

If desired, I may provide a separate switch for synchronizing the flash as shown in Fig. 8. In this figure I provide a block of insulation 40 carrying a relatively-fixed contact 41 and a relatively-movable contact 42, the latter lying in the path of the flange 31 of the cover blind 4. Thus, when the cover blind swings in a clockwise direction, the lug 31 will strike and flex the movable contact 42 to make the flash circuit, here shown as consisting of wire 43, lamp 44, battery 45, and wire 46.

If desired, a screw 47 may be provided for adjusting the switch 41—42 to initially position the switch for proper synchronization.

It will be noticed that with both forms of my invention the switch-closing member, which may, or may not, be a switch contact, is operated directly from the shutter trigger through a hairpin spring which must be tensioned and released. Thus, the speed of actuation of the trigger is immaterial because the synchronization is obtained through a lost motion connection between the cover blind and the shutter plate. Since movement of the shutter plate is initiated by movement of the cover blind when the lost motion in a clockwise direction is taken up, and since the speed of movement of both the cover blind 4 and the shutter plate 5 is controlled by the springs 17 and 18, a switch operated through the cover blind will have to be in synchronism with the operation of the shutter blade. In both embodiments of my invention, the shutter parts are extremely few and simple and the synchronizing switch can likewise consist of but few and simple parts. In spite of the simplicity of these parts, synchronization is reliable.

While I have illustrated several embodiments showing a preferred form of my invention, it is obvious that other embodiments can readily be designed to fit into various different types of cameras. I consider as within the scope of my invention all such forms as may come within the scope of the appended claims.

I claim:

1. In a flash synchronizing shutter, the combination with a shutter mechanism comprising an apertured support, a pair of pivotally-mounted plates each adapted to move to uncover and cover the aperture in the support, the first constituting a cover blind and the second a shutter plate, a movably-mounted trigger, two springs, one attached to the cover blind and the other attached to the shutter plate, both springs being attached to and movable by the trigger, and a lost motion connection between the cover blind and the shutter plate, of a flash synchronizing switch carried by the support, a protuberance on the cover blind, said flash synchronizing switch including a movable switch element and a relatively fixed contact lying in the path of the protuberance constituting the other switch element, means for connecting said switch to a circuit including a source of power and a lamp to be flashed thereby when said switch is closed, said trigger tensioning and releasing the cover blind spring in advance of the shutter spring whereby said cover blind may close the switch before the shutter plate uncovers and covers the exposure aperture.

2. The flash synchronizing shutter defined in claim 1 characterized by the lost motion connection between the cover blind and shutter plate controlling relative movement of the cover blind and shutter plate whereby the switch is operable in timed relation to movement of the shutter plate.

3. In a flash synchronizing shutter, the combination with a shutter mechanism comprising an apertured support, a pair of pivotally mounted plates each adapted to move to uncover and cover the aperture in the support, the first constituting a cover blind and the second a shutter plate, a movably mounted trigger, two springs, one attached to the cover blind and the other attached to the shutter plate, both springs being attached to and movable by the trigger, and a lost motion connection between the cover blind and the shutter plate, of a flash synchronizing switch carried by the support, said switch being normally open and including relatively fixed and movable elements, means carried by the cover blind for engaging and closing the switch, and means for connecting the switch to a flash light circuit including a battery and a lamp to be flashed thereby upon closing of the switch.

4. A flash synchronizing shutter as defined in claim 3 characterized by said switch serving also as a stop limiting the movement of the cover blind in one direction.

5. In a flash synchronizing shutter, the combination with a shutter mechanism comprising an apertured support, a pivoted shutter plate having an exposure slot therein for uncovering and covering the aperture in the support, a pivoted cover blind having an aperture therein adapted to uncover and cover the exposure aperture, interengaging parts on the shutter plate and cover blind permitting limited movement of one relative to the other, a movable trigger, two hair-pin springs each carried by the trigger, one spring being attached to the cover blind and the other being attached to the shutter plate, both springs being tensioned through movement of the trigger, the cover blind spring being released after being tensioned by the trigger while the shutter plate spring is tensioned whereby the cover blind may swing to uncover the aperture and may take up the lost motion between the interengaging parts thereby causing the shutter plate to move, of a switch normally spring-held open lying in the path of the cover blind to be closed thereby in timed relation to movement of the shutter plate, and means attachable to the switch and including a circuit, a flash lamp and battery both in the circuit for flashing the flash lamp when said switch is closed.

MILLER R. HUTCHISON, Jr.

REFERENCES CITED

The following references are of record in the file of this patent:

UNITED STATES PATENTS

| Number | Name | Date |
| --- | --- | --- |
| 2,198,975 | Pollock | Apr. 30, 1940 |
| 2,278,173 | Goering | Mar. 31, 1942 |